(12) United States Patent
Stauton-Lambert et al.

(10) Patent No.: US 7,703,115 B2
(45) Date of Patent: Apr. 20, 2010

(54) GRAPHICAL INDICATION OF SELECTED CELL WITHIN AN INTERACTIVE PROGRAM GUIDE

(75) Inventors: Kevin John Stauton-Lambert, Sydney (AU); Irvan J. Krantzler, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 799 days.

(21) Appl. No.: 10/908,878

(22) Filed: May 31, 2005

(65) Prior Publication Data

US 2006/0271962 A1 Nov. 30, 2006

(51) Int. Cl.
*H04N 5/445* (2006.01)
(52) U.S. Cl. .................... 725/40; 725/38; 725/39
(58) Field of Classification Search .......... None
See application file for complete search history.

(56) References Cited

U.S. PATENT DOCUMENTS

| | | | |
|---|---|---|---|
| 5,353,121 A * | 10/1994 | Young et al. ............ 725/52 |
| 5,410,367 A * | 4/1995 | Zahavi et al. ............ 725/58 |
| 5,585,838 A * | 12/1996 | Lawler et al. ............ 725/54 |
| 6,347,400 B1 * | 2/2002 | Ohkura et al. ............ 725/60 |
| 6,481,011 B1 * | 11/2002 | Lemmons ............ 725/47 |
| 7,203,952 B2 * | 4/2007 | Broadus ............ 725/40 |
| 2004/0055007 A1 * | 3/2004 | Allport ............ 725/39 |
| 2008/0082927 A1 * | 4/2008 | Kelts ............ 715/762 |

* cited by examiner

*Primary Examiner*—Hunter B. Lonsberry
*Assistant Examiner*—Oschta Montoya
(74) *Attorney, Agent, or Firm*—Lewinski Law Group LLC

(57) ABSTRACT

An electronic program guide (EPG) having a variable indicator to focus a user's attention upon a corresponding field of a selectable program instance The EPG includes a user interface screen for providing a plurality of television program instances by time and channel in a grid menu. Each television program becomes selectable from the EPG based upon user interaction. The indicator is depicted in association with each television program when it becomes selectable as a result of user interaction. The indicator is configured based upon attributes of the currently selectable program instance.

7 Claims, 4 Drawing Sheets

GRAPHICAL INDICATION OF SELECTED CELL WITHIN AN INTERACTIVE PROGRAM GUIDE

TECHNICAL FIELD

The present invention relates to rendering of user interface screens and, more particularly, relates to providing an electronic program guide for use in a subscription television system where a user is permitted to select programs from the electronic program guide.

BACKGROUND OF THE INVENTION

Subscription television systems typically include an electronic program guide (EPG). With the development of interactive digital set-top boxes (STBs), a new type of advanced multimedia EPG was developed which may be referred to sometimes as interactive program guides (IPGs). Today, the acronyms EPG and IPG have been used interchangeably. The EPG provides an onscreen display of a program grid menu that includes a program lineup and episode information for every channel for the next several days. The program grid menu may be arranged in various ways. The program grid menu itself is a user interface where the user may navigate the program grid menu using arrow keys on a remote. For example, a typical EPG would have a program grid menu based on available channel and time. The user can navigate or scroll through the list of programs within a selected time slot until the desired program is highlighted. The boundaries of other fields associated with the highlighted field may also be highlighted such as the corresponding channel and time. The highlighted field may also sometimes be referred to either as a pill or as being active. Once the desired field is highlighted as a selectable item, the user may select the highlighted field using the select button on the remote.

Typically, a field in the EPG is shown as being highlighted by using a different color background relative to the background of any other field. Alternatively, a selectable field may be depicted as being enlarged or oversized. For the purposes of describing the present invention, the surrounding boundary or edge of the field corresponding with a selectable field is bolded to depict a field being highlighted. Although the present invention illustrates EPGs having a particular configuration or number of fields, today's EPGs include hundreds or even thousands of possibilities which the user may scroll through, highlight and select. Therefore, because of the increasing number of options within an EPG, as well as because of the difficulty some users have determining which item is selectable, there is a need to bring greater attention to the selectable item within the EPG.

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Figure 1:
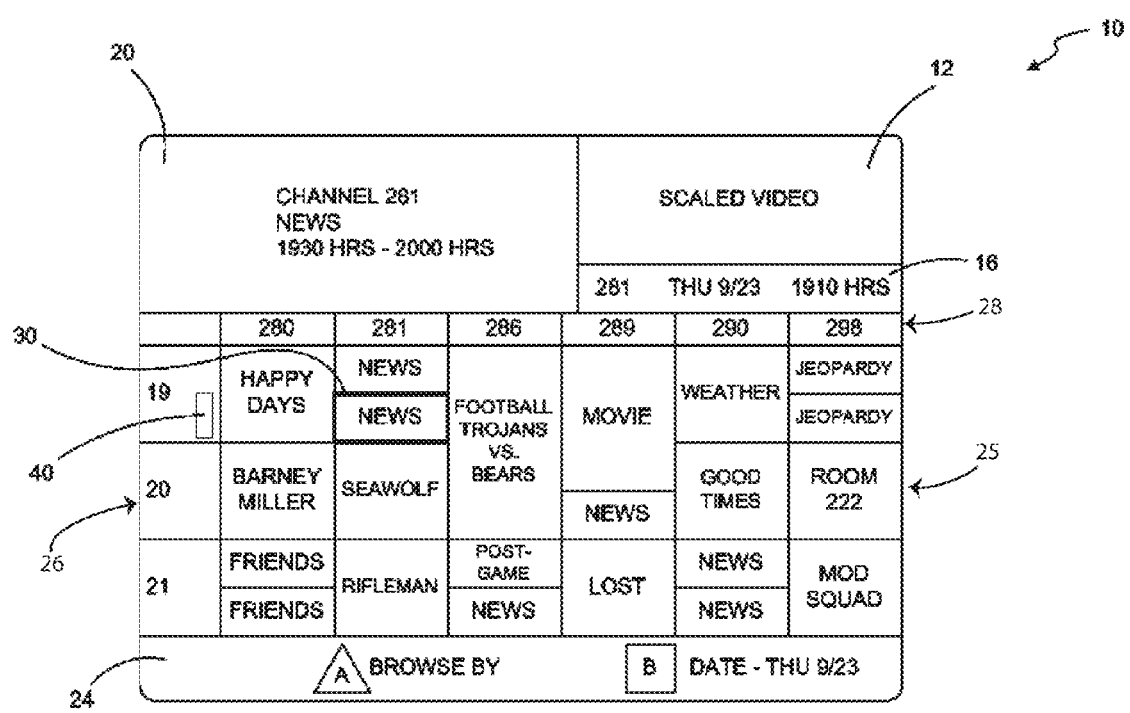
FIG. 1 illustrates a screen-shot of a graphical user interface screen having an instance of a program highlighted as being selectable as well as having an indicator along a vertical time axis corresponding with the selectable instance according to one embodiment of the present invention.

FIG. 1 illustrates a screen-shot of a graphical user interface screen 10 of an EPG according to one embodiment of the present invention. The screen 10 may be presented in response to user input that may be provided via the activation of a guide key on a remote control, for example, the "Guide" key. In the top right of the screen 10, video corresponding to the channel to which a device is currently tuned may be displayed in the video area 12. Immediately below the video area 12 is an information banner 16 for displaying the channel number corresponding to the channel to which the device is currently tuned, the current day and date, and the current time. The method used to indicate time in the present invention is commonly referred to as military time. However, other methods of indicating time may be utilized.

The top left portion of the screen 10 is a detailed focus area 20 may include detailed information for a currently selectable instance of a program. The detailed focus area 20 may include channel number, channel description, presentation name, duration of the presentation, and/or any episode information or rating. The bottom area 24 of the screen 10 also indicates the current day for which presentation listing data is being displayed as well as information about the current functions of the optional "A" and "B" keys that may be on the remote controls and are used in conjunction with the EPG. Further information regarding an interactive program guide can be found in copending U.S. patent application Ser. No. 10/212,017 filed on Aug. 2, 2002, the disclosure and teachings of which are hereby incorporated by reference.

The user interface screen 10 of FIG. 1 includes a grid menu of television program instances in program instance fields 25 that can be identified by time and channel. In FIG. 1, the time corresponding to each of the program instances is provided in a time portion 26, that is arranged vertically in a column along the left of the grid menu in the example embodiment of FIG. 1. The channel corresponding to each instance is shown in a channel portion 28, depicted as a horizontal row along the top of the grid menu.

Each row of fields within the grid menu is scrollable up and down and to the left and right where each scroll highlights a different field. For example, as a user scrolls in time across the grid menu, different program instances corresponding with different program instance fields 25 are highlighted as selectable and information such as the day and date indications displayed in various areas of the screen 10 are updated. However, as explained above, the television programs may be arranged in any other manner. For example, the user interface screen of an EPG may be configured such that the EPG itself appears to move while a selectable field which is highlighted is maintained at the center of the grid menu. Preferably, the user interface screen 10 is created by utilizing images which may be tiled or stretched as background for drawn text. These background images may be tiled in either horizontal or vertical directions. Those skilled in the art appreciate that any tilable image carries with it information so that the image can morph itself when the image is displayed. For example, in FIG. 1, the user interface screen 10 includes one or more background images and accompanying text which correspond with the horizontal list of channels. One or more other background images may be utilized to correspond with the columns and rows of program instance fields 25 which make up the program grid of television programs. Text is then drawn over these background images to identify each instance of the programs presented from the EPG. Other background images may be utilized elsewhere in the user interface screen 10.

Still referring to FIG. 1, a television program instance titled "News", which corresponds with program channel 281 and has a start time of 1930 Hrs, is identified by reference number 30. The edge of the program instance field having the text for identifying the television program instance 30 is bolded to depict being highlighted as a result of user interaction such as scrolling through the program grid.

The screen 10 of the present invention also includes an indicator 40 according to one embodiment of the invention. The indicator 40 is preferably utilized as part of interactive television such as with an EPG/IPG to indicate position, start and end times, and/or duration of a selectable instance of a program. In FIG. 1, the indicator 40 corresponds with the position in the grid menu of the highlighted and selectable television program instance 30 titled "News". However, the indicator 40 may be utilized elsewhere as part of any graphical user interface that may be implemented as part of, for example, video games, interactive course ware, PDA's, cell phones, etc.

In one embodiment, the indicator 40 may be, but is not limited to, one or more graphic elements, separate or in combination with one another, which could be a graphic primitive such as a rectangle or oval or a complex image format such as GIF, JPEG, PNG or others, which may be configured in any number of ways. Preferably, the indicator 40 is variably sized depending on the attributes of the corresponding selectable program instance. Because of the variable size of the indicators of the present invention, the indicators of the present invention may be referred to as thermometers that measure the position, start and end times, and/or duration of a selectable program instance.

Figure 2:
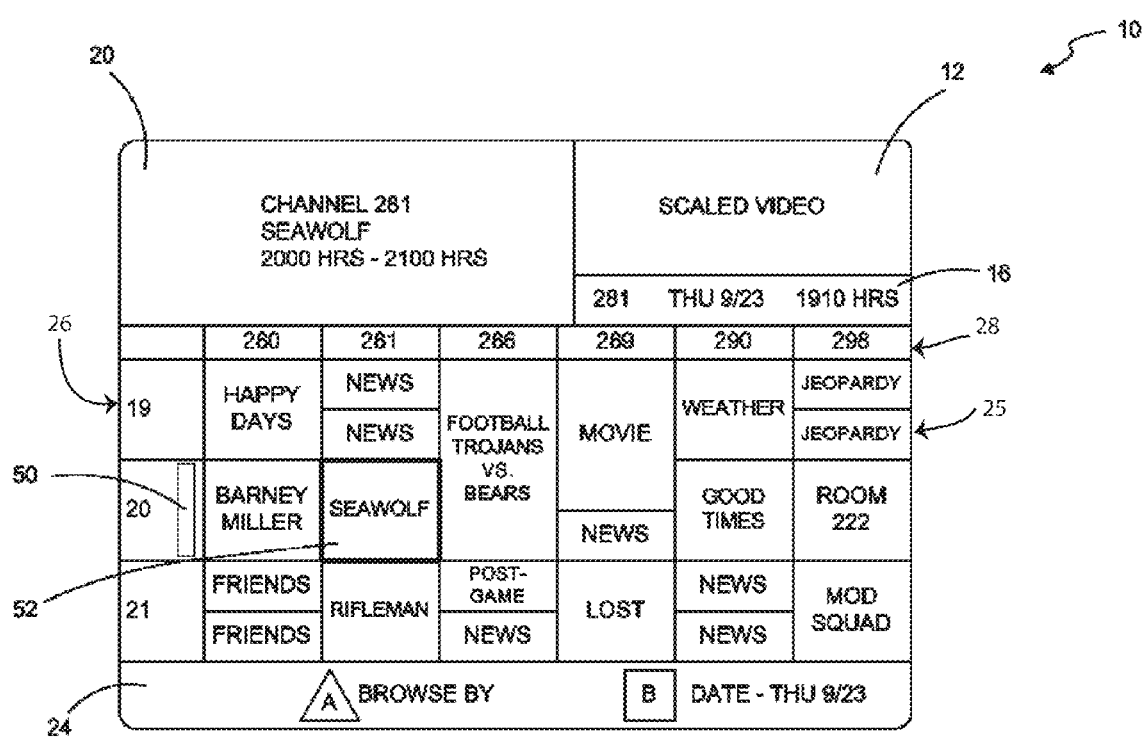
FIG. 2 illustrates the graphical user interface screen of FIG. 1 with a different highlighted instance and corresponding indicator.
Figure 3:
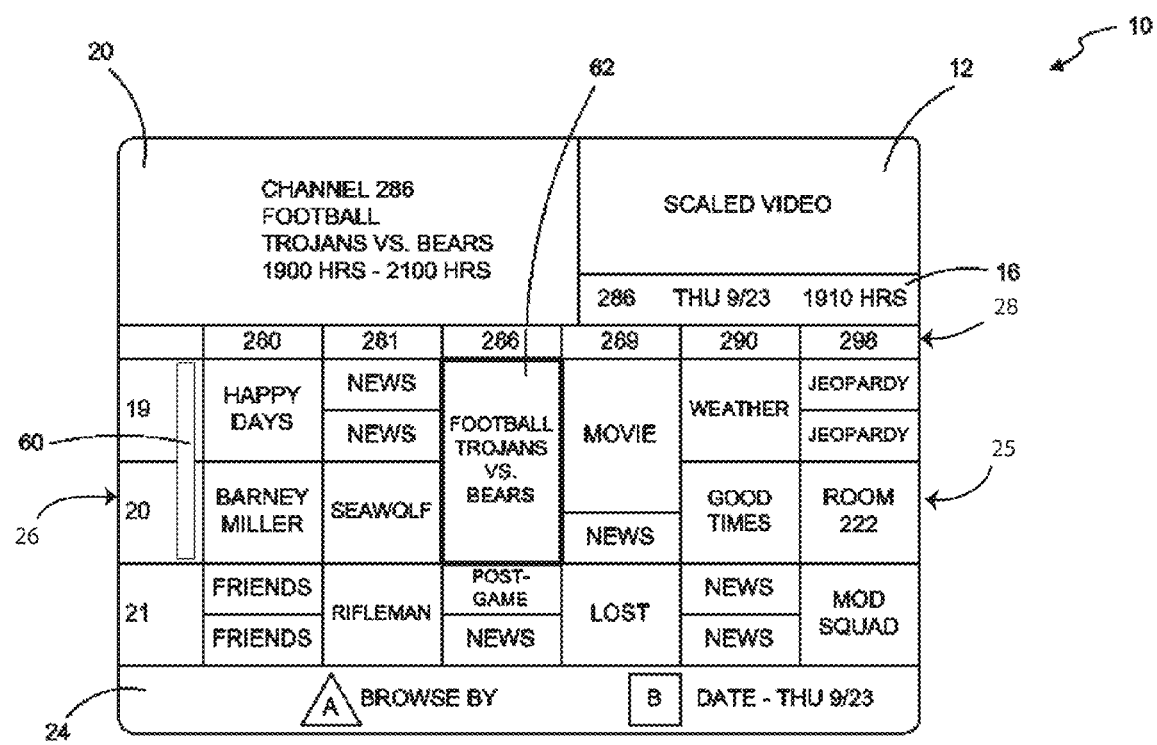
FIG. 3 illustrates the graphical user interface screen of FIG. 1 with yet another different highlighted instance and corresponding indicator.

In FIGS. 1-3, the indicator 40 is depicted as being part of the vertical column indicating time in the grid menu and is, therefore, elongated in the vertical direction. Preferably, the indicator does not appear to fill the entire field of a time period. For example, the width of the indicator does not extend over the rest of the tile behind the text identifying the channel number of the program instance 30.

Indicators of the present invention may also indicate the start time as well as the duration of a program instance. Still referring to FIG. 1, one of the ends the indicator 40 corresponds with the start time of the corresponding selectable program instance 30, which is 1930 Hours, and the other end of the indicator 40 corresponds with the end time of the corresponding selectable program instance 30, which is 2000 Hours. Therefore, the indicator 40 not only conveys position, the length of the indicator 40 corresponds with the duration of the selectable program instance 30 which, in this example, is a half an hour long.

FIG. 2 illustrates an indicator 50 according to another embodiment of the present invention. In FIG. 2, the user has scrolled down in the grid menu of the screen 10 to a later time compared to the time of the selectable program instance 30 shown in FIG. 2. Indicator 50 corresponds with the program instance 52 which is shown to be a full hour in duration because one end of the indicator 50 corresponds with the start time of the corresponding selectable program instance 52, which is 2000 Hours, and the other end of the indicator 40 corresponds with the end time of the corresponding selectable program instance 30, which is 2100 Hours.

FIG. 3 illustrates an indicator 60 according to another embodiment of the present invention. In FIG. 3, the user has scrolled to the right in the grid menu of the screen 10 to a different channel than the channel of either of the selectable program instances 30, 50 of FIGS. 1 and 2. Indicator 60 corresponds with the program instance 62 which is shown to be two hours in length. One end of the indicator 60 corresponds with the start time of the selectable program instance 62, which is 1900 Hours, and the other end of the indicator 60 corresponds with the end tine of the selectable program instance 62, which is 2100 Hours.

Figure 4:
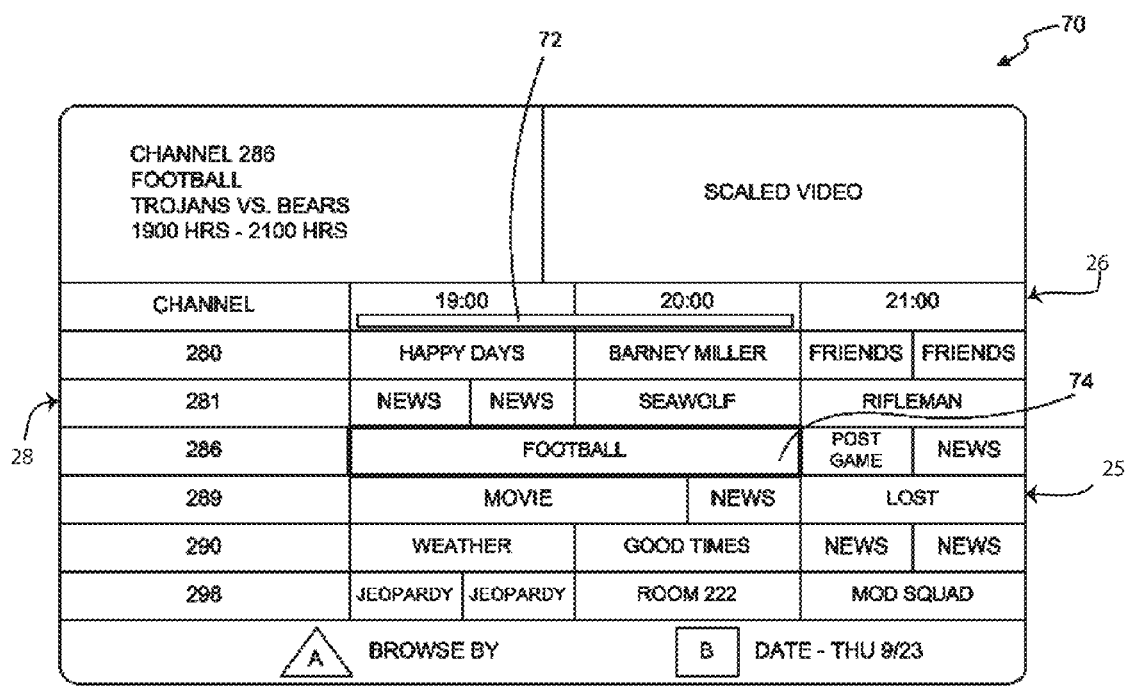
FIG. 4 illustrates a screen-shot of an alternative graphical user interface having an indicator along a horizontal time line according to another embodiment of the present invention.

FIG. 4 illustrates a screen-shot of an alternative graphical user interface screen 70 of an EPG according to another embodiment of the present invention. As does screen 10 described-above in regard to FIGS. 1-3, screen 70 includes a grid menu of television program instances identified by time and channel. However, the screen 70 is distinguishable from screen 10 because in FIG. 4 the channels corresponding to each of the program instances are arranged vertically in a column along the left of the grid menu and the time corresponding to each instance is shown in a horizontal row along the top of the grid menu.

In FIG. 4, an indicator 72 corresponds with the position in the grid menu of a highlighted and selectable television program instance 74 which is in the same time slot of the same program as program instance 62 is in FIG. 3. However, because time and channel in FIG. 4 is inverted to the time and channel of FIG. 3, the indicator 72 is horizontally oriented rather than vertically oriented. One end of the indicator 72 corresponds with the start time of the selectable program instance 74, which is 1900 Hours, and the other end of the indicator 72 corresponds with the end time of the selectable program instance 74, which is 2100 Hours.

In some embodiments, the attributes of the indicators of the present invention may be controlled by the user. For example, the colors of the indicators of the present invention may also be varied based upon the genre of the highlighted selectable program instance or be determined by user controlled preferences. The user may also control other attributes of the indicator, for example, such as the height, width, invisibility, brightness, or whether the indicator is on or off. Also, the indicators of the present invention may be intermittently displayed to the user. For example, the indicator may be made to appear to blink to gain the users attention to then help the user find the currently selectable field. In another embodiment, the indicator may no longer blink when the user is no longer scrolling and after a particular program instance has been highlighted for a particular period of time. In another embodiment, the rate at which the indicator blinks can be varied depending upon the length of time a particular program instance is highlighted. The rate at which the indicator blinks may also be based upon the duration of the currently selectable program. For example, program instances which are shorter in duration may have corresponding indicators which blink more frequently to gain the users attention than do program instances which are longer in duration.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A system for providing an electronic program guide (EPG), comprising:
    a means for providing an EPG; and
    a means for displaying said EPG; said EPG comprising a user interface screen for providing a plurality of program instances arranged by time and channel in a grid menu, said grid menu having program instance fields for identifying said program instances, each said program instance being selectable from said EPG based upon user interaction, and an indicator depicted in association with each said program instance when said program instance becomes selectable as a result of said user interaction, said indicator comprising a graphic element having a length that depends on the duration of said program instance when selectable, said indicator having a first end corresponding with a start time of said program instance and a second end corresponding with an end time of said program instance, wherein the user's attention is focused upon said selectable program instance by said indicator, said indicator depicted in said user interface screen within a time portion of the grid menu, and wherein said indicator blinks at a rate depending upon a period of time that said one selectable program instance is highlighted.

2. The system of claim 1, wherein said indicator indicates a position of said program instance in said grid menu.

3. A method for focusing a user's attention within an electronic program guide (EPG), said method comprising the following steps:
    said user navigating through a plurality of program instance fields for identifying program instances of a user interface screen, the user interface screen comprising the program instances arranged by time and channel in a grid menu, each said program instance being selectable from said EPG based upon user interaction;
    identifying one of said program instance fields as being selectable based upon said user's interaction with said EPG; and
    in response to said one program instance field being selectable, rendering an indicator in association with said one field, wherein said indicator comprises a graphic element having a length dependent on the duration of said program instance identified by said one program instance field, said indicator having a first end corresponding with a start time of said program instance identified by said one program instance field, and a second end corresponding with an end time of said program instance identified by said one program instance field, said indicator rendered at a position that depends on said one program instance field, said indicator included within a time portion of the grid menu, wherein said indicator blinks at a rate bated upon a duration of said one selectable program instance.

4. The method of claim 3 further comprising the steps of said indicator corresponding with another said program instance field when becoming selectable and said one program instance field no longer being selectable due to said user interaction, and varying said indicator based upon the duration of another program instance identified by said other program instance field.

5. The method of claim 3, wherein said indicator indicates a position of said one program instance field in said grid menu or a size of said one program instance field.

6. The method of claim 3 wherein as the user navigates through the plurality of program instance fields, the indicator scrolls within the time portion.

7. A system for providing an electronic program guide (EPG), comprising:
    a means for providing an EPG; and
    a means for displaying said EPG; said EPG comprising a user interface screen for providing a plurality of program instances arranged by time and channel in a grid menu, said grid menu having program instance fields for identifying said program instances, each said program instance being selectable from said EPG based upon user interaction, and an indicator depicted in association with each said program instance when said program instance becomes selectable as a result of said user interaction, said indicator comprising a graphic element having a length that depends on the duration of said program instance when selectable, said indicator having a first end corresponding with a start time of said program instance and a second end corresponding with an end time of said program instance, wherein the user's attention is focused upon said selectable program instance by said indicator, said indicator depicted in said user interface screen within a time portion of the grid menu, wherein said indicator blinks at a rate based upon a duration of said one selectable program instance.

* * * * *